United States Patent
Condra

(10) Patent No.: US 9,871,786 B2
(45) Date of Patent: Jan. 16, 2018

(54) AUTHENTICATING COMMUNICATIONS

(71) Applicant: Google Inc., Mountain View, CA (US)

(72) Inventor: Curtis Gerald Condra, San Jose, CA (US)

(73) Assignee: Google LLC, Mountain View, CA (US)

( * ) Notice: Subject to any disclaimer, the term of this patent is extended or adjusted under 35 U.S.C. 154(b) by 262 days.

(21) Appl. No.: 14/807,563

(22) Filed: Jul. 23, 2015

(65) Prior Publication Data

US 2017/0026370 A1 Jan. 26, 2017

(51) Int. Cl.
*H04L 29/06* (2006.01)
*H04W 12/06* (2009.01)
*H04L 9/32* (2006.01)

(52) U.S. Cl.
CPC ......... *H04L 63/0846* (2013.01); *H04W 12/06* (2013.01); *H04L 9/3236* (2013.01); *H04L 2209/38* (2013.01)

(58) Field of Classification Search
CPC ............. H04L 63/0846; H04L 2209/38; H04L 9/3236; H04W 12/06
USPC ........................................................ 713/159
See application file for complete search history.

(56) References Cited

U.S. PATENT DOCUMENTS

| | | |
|---|---|---|
| 5,606,616 A | 2/1997 | Sprunk et al. |
| 5,892,829 A | 4/1999 | Aiello et al. |
| 5,995,626 A | 11/1999 | Nishioka et al. |
| 6,021,201 A | 2/2000 | Bakhle et al. |
| 6,829,355 B2 | 12/2004 | Lilly |

(Continued)

FOREIGN PATENT DOCUMENTS

| | | |
|---|---|---|
| WO | WO-2009/100112 A2 | 8/2009 |
| WO | WO-2010/024379 A1 | 3/2010 |

(Continued)

OTHER PUBLICATIONS

Nat'l Institute of Standards and Tech., Special Pub. No. 800-131A, "Transitions: Recommendation for Transitioning the Use of Cryptographic Algorithms and Key Lengths" (2011).

(Continued)

*Primary Examiner* — Kambiz Zand
*Assistant Examiner* — Aubrey Wyszynski
(74) *Attorney, Agent, or Firm* — Honigman Miller Schwartz and Cohn LLP

(57) ABSTRACT

The method of authenticating the source of a communication is disclosed. The method includes executing a clock for an operation period. The method also includes receiving a communication from a remote device at a communication time corresponding to a time interval of a plurality of time intervals sequentially covering the operation period. Each time interval has an associated authentication value. The communication includes a commitment value. The method also includes determining whether the commitment value matches the authentication value associated with the time interval corresponding to the communication time. The method also includes processing the communication when the commitment value matches the authentication value associated with the time interval corresponding to the communication time. The authentication value associated with the time interval corresponding to the communication time includes a hash digest of a hash function applied to the authentication value associated with a sequentially subsequent time interval.

22 Claims, 11 Drawing Sheets

(56) References Cited

U.S. PATENT DOCUMENTS 7,464,266 B2    12/2008   Wheeler
8,121,284 B2     2/2012   Noda et al.

FOREIGN PATENT DOCUMENTS

WO     WO-2010/086855 A2    8/2010
WO     WO-2014/158604 A1    10/2014

OTHER PUBLICATIONS

Nat'l Institute of Standards and Tech., Special Pub. No. 800-107 rev. 1, "Recommendation for Applications Using Approved Hash Algorithms" (2012).
Nat'l Institute of Standards and Tech., Fed. Information Processing Standards Publication No. 190-4, "Secure Hash Standards (SHS)" (2012).

AUTHENTICATING COMMUNICATIONS

STATEMENT AS TO SECRECY

This disclosure is subject to the International Traffic in Arms Regulations (ITAR).

TECHNICAL FIELD

This disclosure relates to communications between devices of a communication network and to authenticating communications between such devices.

BACKGROUND

A communication network is a large distributed system for receiving information (signal) and transmitting the information to a destination. Over the past few decades the demand for communication access has dramatically increased. Although conventional wire and fiber landlines, cellular networks, and geostationary satellite systems have continuously been increasing to accommodate the growth in demand, the existing communication infrastructure is still not large enough to accommodate the increase in demand. In addition, some areas of the world are not connected to a communication network and therefore cannot be part of the global community where everything is connected to the internet.

Satellites are used to provide communication services to areas where wired cables cannot reach. Satellites may be geostationary or non-geostationary. Geostationary satellites remain permanently in the same area of the sky as viewed from a specific location on earth, because the satellite is orbiting the equator with an orbital period of exactly one day. Non-geostationary satellites typically operate in low- or mid-earth orbit, and do not remain stationary relative to a fixed point on earth; the orbital path of a satellite can be described in part by the plane intersecting the center of the earth and containing the orbit. The satellites may be part of a communication system that includes ground stations communicating with the satellites. Additionally, communications devices operating at high altitudes of the earth's atmosphere known as high altitude platforms (HAPs) may be utilized as linking gateways between the satellites and the ground stations.

SUMMARY

One aspect of the disclosure provides a method that includes executing, by data processing hardware, a clock for an operation period starting at a first time and ending at a final time. The method also includes receiving, at the data processing hardware, a communication from a remote device at a communication time corresponding to a time interval of a plurality of time intervals sequentially covering the operation period. Each time interval has an associated authentication value. The communication includes a commitment value. The method also includes determining, by the data processing hardware, whether the commitment value matches the authentication value associated with the time interval corresponding to the communication time. Also, the method includes processing the communication at the data processing hardware when the commitment value matches the authentication value associated with the time interval corresponding to the communication time. The authentication value associated with the time interval corresponding to the communication time includes a hash digest of a hash function applied to the authentication value associated with a sequentially subsequent time interval of the plurality of time intervals.

Implementations of this aspect of the disclosure may include one or more of the following optional features. In some examples, before executing the clock for the operation period, the method includes receiving a seed value and associating the authentication values to the plurality of time intervals based on the seed value. The data processing hardware receives the seed value and associates the authentication values by applying the hash function to the seed value to determine a last authentication value for a last time interval and, for each sequentially preceding time interval, applying the hash function to a subsequent authentication value associated with a sequentially subsequent time interval to determine a preceding authentication value for the sequentially preceding time interval. In some implementations, the communication can include a connection request and the method further includes establishing a communication connection between the data processing hardware and the remote device when the commitment value matches the authentication value associated with the time interval corresponding to the communication time. After establishing the communication connection, the method may include receiving at least one data packet including data from the remote device.

In some implementations, the remote device is a satellite. The communication may further include global positioning system data including position and time information. In some examples, the remote device is a communication station. The communication may further include a direct high altitude platform communication signal. In some implementations, the method determines whether the commitment value matches the authentication value associated with the time interval corresponding to the communication time by applying the hash function to the commitment value and determining whether the hash digest of the hash function matches a subsequent authentication value associated with a sequentially subsequent time interval.

Another aspect of the disclosure provides a system including data processing hardware and memory hardware. The memory hardware communicates with the data processing hardware and stores instructions. When executed on the data processing hardware, the instructions stored on the memory hardware cause the data processing hardware to perform operations. The operations include executing a clock for an operation period starting at a first time and ending at a final time. The operations further include receiving a communication from a remote device at a communication time corresponding to a time interval of a plurality of time intervals sequentially covering the operation period. Each time interval has an associated authentication value. The communication includes a commitment value. The operations further include determining whether the commitment value matches the authentication value associated with the time interval corresponding to the communication time. In addition, the operations include processing the communication when the commitment value matches the authentication value associated with the time interval corresponding to the communication time. The authentication value associated with the time interval corresponding to the communication time includes a hash digest of a hash function applied to the authentication value associated with a sequentially subsequent time interval of the plurality of time intervals Implementations of this aspect of the disclosure may include one or more of the following optional features. In some examples, the operations further include, before executing the clock for the operation period, receiving a seed value and associating the authentication values to the plurality of time intervals by applying the hash function to the seed value to determine a last authentication value for a last time interval and, for each sequentially preceding time interval, applying the hash function to a subsequent authentication value associated with a sequentially subsequent time interval to determine a preceding authentication value for the sequentially preceding time interval. In some implementations, the communication includes a connection request and the operations further include establishing a communication connection between the data processing hardware and the remote device when the commitment value matches the authentication value associated with the time interval corresponding to the communication time. In some examples, the operations further include, after establishing the communication connection, receiving at least one data packet comprising data from the remote device.

In some implementations, the remote device is a satellite. The communication may further include global positioning data including position and time information. In some examples, the remote device is a communication station. The communication may further include a direct high altitude platform communication signal. In some implementations, the operations determine whether the commitment value matches the authentication value associated with the time interval corresponding to the communication time by applying the hash function to the commitment value and determining whether the hash digest of the hash function matches a subsequent authentication value associated with a sequentially subsequent time interval.

Yet another aspect of the disclosure provides a method that includes receiving, at data processing hardware, a seed value and associating, by the data processing hardware, authentication values to a plurality of time intervals sequentially covering an operation period. The data processing hardware associates authentication values by applying a hash function to the seed value to determine a last authentication value for a last time interval of the plurality of time intervals and, for each sequentially preceding time interval, applying the hash function to a subsequent authentication value associated with a sequentially subsequent time interval to determine a preceding authentication value for the sequentially preceding time interval. The method also includes determining, by the data processing hardware, a current time interval of the plurality of time intervals corresponding to a current time. In addition, the method includes sending, from the data processing hardware to a remote device, a communication comprising a current authentication value associated with the current time interval.

Implementations of this aspect of the disclosure may include one or more of the following optional features. In some implementations, the communication is a connection request for a remote device. The method may further include establishing a communication connection between the data processing hardware and the remote device when the current authentication value associated with the current time interval matches a commitment value of the remote device associated with a communication time of the communication. In some examples, the remote device is a high altitude platform. The communication may further include global positioning system data including position and time information. In some implementations, the method further includes executing a clock and determining the current time using the clock. The data processing hardware executes the clock.

Yet another aspect of the disclosure provides a system including data processing hardware and memory hardware. The memory hardware communicates with the data processing hardware and stores instructions that, when executed on the data processing hardware, cause the data processing hardware to perform operations that include receiving a seed value. The operations further include associating authentication values to a plurality of time intervals sequentially covering an operation period by applying a hash function to the seed value to determine a last authentication value for a last time interval of the plurality of time intervals and, for each sequentially preceding time interval, applying the hash function to a subsequent authentication value associated with a sequentially subsequent time interval to determine a preceding authentication value for the sequentially preceding time interval. The operations also include determining a current time interval of the plurality of time intervals corresponding to a current time. In addition, the operations include sending, to a remote device, a communication comprising a current authentication value associated with the current time interval.

Implementations of the disclosure may include one or more of the following optional features. In some implementations, the communication includes a connection request for the remote device. The operations may further include establishing a communication connection between the data processing hardware and the remote device when the current authentication value associated with the current time interval matches a commitment value of the remote device associated with a communication time of the communication. In some examples, the remote device is a high altitude platform. The communication may further include global positioning system data including position and time information. In some implementations, the operations further include executing a clock and determining the current time using the clock.

The details of one or more implementations of the disclosure are set forth in the accompanying drawings and the description below. Other aspects, features, and advantages will be apparent from the description and drawings, and from the claims.

DETAILED DESCRIPTION

Figure 1A:
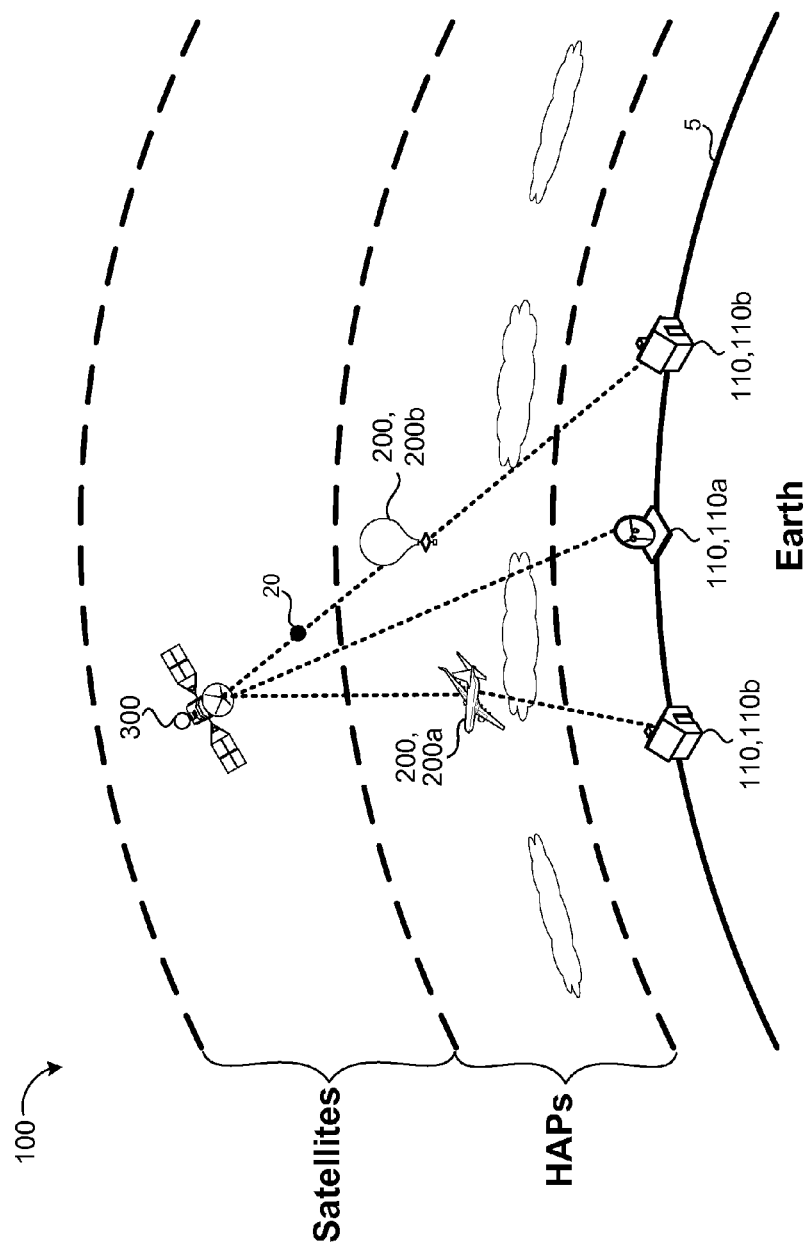
FIG. 1A is schematic view of an exemplary communication system.
Figure 1B:
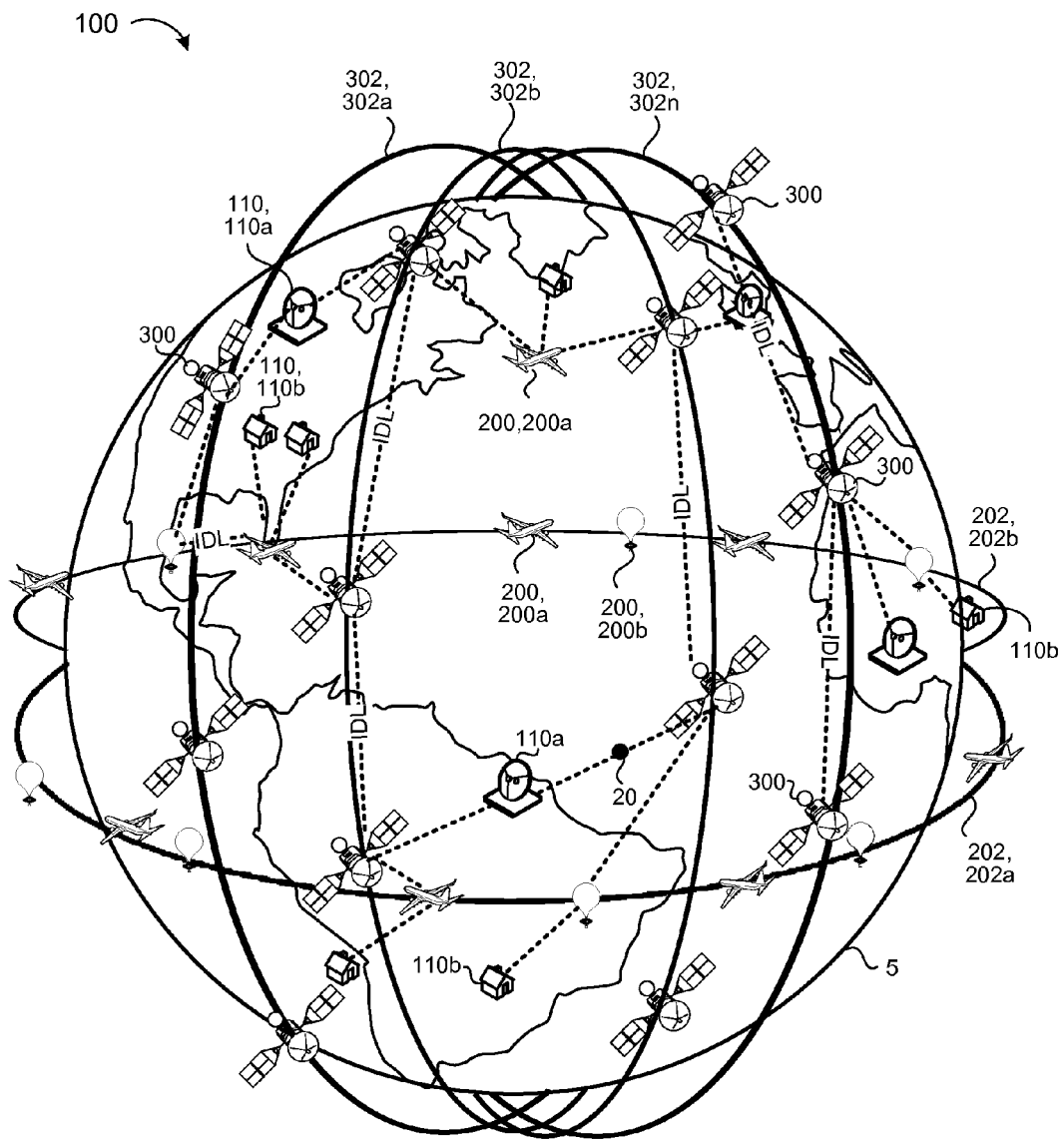
FIG. 1B is schematic view of an exemplary global-scale communication system, where an exemplary group of satellites form a polar constellation.
Figure 1C:
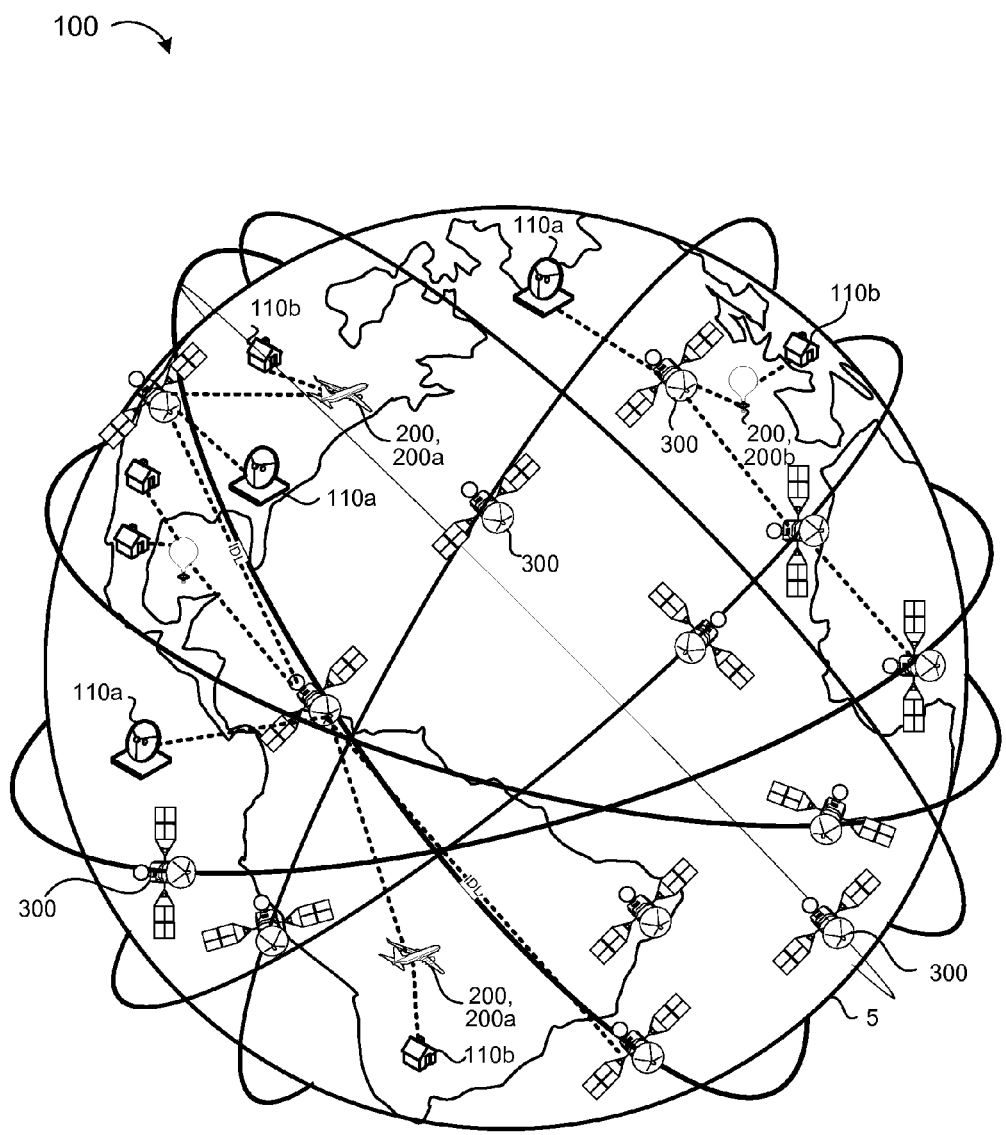
FIG. 1C is schematic view of an exemplary global-scale communication system, where an exemplary group of satellites form a Walker constellation.

Referring to FIGS. 1A-1C, in some implementations, a global-scale communication system 100 includes gateways 110 (e.g., source ground stations 110a and destination ground stations 110b), high altitude platforms (HAPs) 200, and satellites 300. The source ground stations 110a may communicate with the satellites 300, the satellites 300 may communicate with the HAPs 200, and the HAPs 200 may communicate with the destination ground stations 110b. In some examples, the source ground stations 110a also operate as linking-gateways between satellites 300. The source ground stations 110a may be connected to one or more service providers, and the destination ground stations 110b may be user terminals (e.g., mobile devices, residential WiFi devices, home networks, etc.). In some implementations, a HAP 200 is an aerial communication device that operates at high altitudes (e.g., 17-22 km). The HAP 200 may be released into the earth's atmosphere, e.g., by an air craft or flown to the desired height. Moreover, the HAP 200 may operate as a quasi-stationary aircraft. In some examples, the HAP 200 is an aircraft 200a, such as an unmanned aerial vehicle (UAV); while in other examples, the HAP 200 is a communication balloon 200b. The satellite 300 may be in Low Earth Orbit (LEO), Medium Earth Orbit (MEO), or High Earth Orbit (HEO), including Geosynchronous Earth Orbit (GEO).

The HAPs 200 may move about the earth 5 along a path, trajectory, or orbit 202 (also referred to as a plane, since their orbit or trajectory may approximately form a geometric plane). Moreover, several HAPs 200 may operate in the same or different orbits 202. For example, some HAPs 200 may move approximately along a latitude of the earth 5 (or in a trajectory determined in part by prevailing winds) in a first orbit 202a, while other HAPs 200 may move along a different latitude or trajectory in a second orbit 202b. The HAPs 200 may be grouped amongst several different orbits 202 about the earth 5 and/or they may move along other paths 202 (e.g., individual paths). Similarly, the satellites 300 may move along different orbits 302, 302a-302n. Multiple satellites 300 working in concert form a satellite constellation. The satellites 300 within the satellite constellation may operate in a coordinated fashion to overlap in ground coverage. In the example shown in FIG. 1B, the satellites 300 operate in a polar constellation by having the satellites orbit the poles of the earth; whereas, in the example shown in FIG. 1C, the satellites 300 operate in Walker constellation, which covers areas below certain latitudes and provides a larger number of satellites 300 simultaneously in view of a gateway 110 on the ground (leading to higher availability and fewer dropped connections).

Figure 2B:
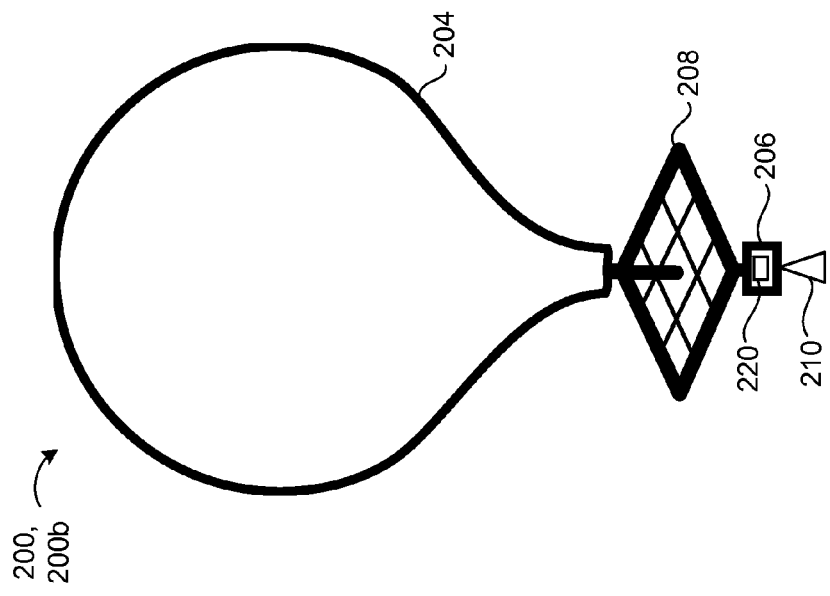
FIGS. 2A and 2B are perspective views of example high-altitude platforms.
Figure 2A:
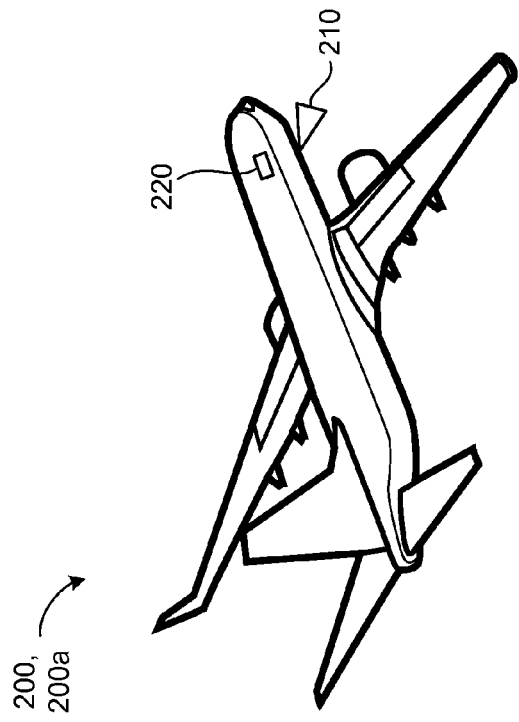

Referring to FIGS. 2A and 2B, in some implementations, the HAP 200 includes an antenna 210 that receives a communication 20 (shown in FIG. 1A) from a satellite 300 and reroutes the communication 20 to a destination ground station 110b and vice versa. The HAP 200 may include a data processing device 220 that processes the received communication 20 and determines a path of the communication 20 to arrive at the destination ground station 110b (e.g., user terminal). In some implementations, user terminals 110b on the ground have specialized antennas that send communication signals to the HAPs 200. The HAP 200 receiving the communication 20 sends the communication 20 to another HAP 200, to a satellite 300, or to a gateway 110 (e.g., a user terminal 110b).

FIG. 2B illustrates an example communication balloon 200b that includes a balloon 204 (e.g., sized about 49 feet in width and 39 feet in height and filled with helium or hydrogen), an equipment box 206, and solar panels 208. The equipment box 206 includes a data processing device 220 that executes algorithms to determine where the high-altitude balloon 200b needs to go, then each high-altitude balloon 200b moves into a layer of wind blowing in a direction that will take it where it should be going. The equipment box 206 also includes batteries to store power and a transceiver (e.g., antennas 210) to communicate with other devices (e.g., other HAPs 200, satellites 300, gateways 110, such as user terminals 110b, internet antennas on the ground, etc.). The solar panels 208 may power the equipment box 206.

Communication balloons 200b are typically released in to the earth's stratosphere to attain an altitude between eleven and twenty-three miles and provide connectivity for a ground area having a twenty-five-mile diameter at speeds comparable to terrestrial wireless data services (such as 3G or 4G). The communication balloons 200b float in the stratosphere, at an altitude twice as high as airplanes and the weather (e.g., 20 km above the earth's surface). The high-altitude balloons 200b are carried around the earth 5 by winds and can be steered by rising or descending to an altitude with winds moving in the desired direction. Winds in the stratosphere are usually steady and move slowly at about between five and twenty mph, and each layer of wind varies in direction and magnitude.

Figure 3:
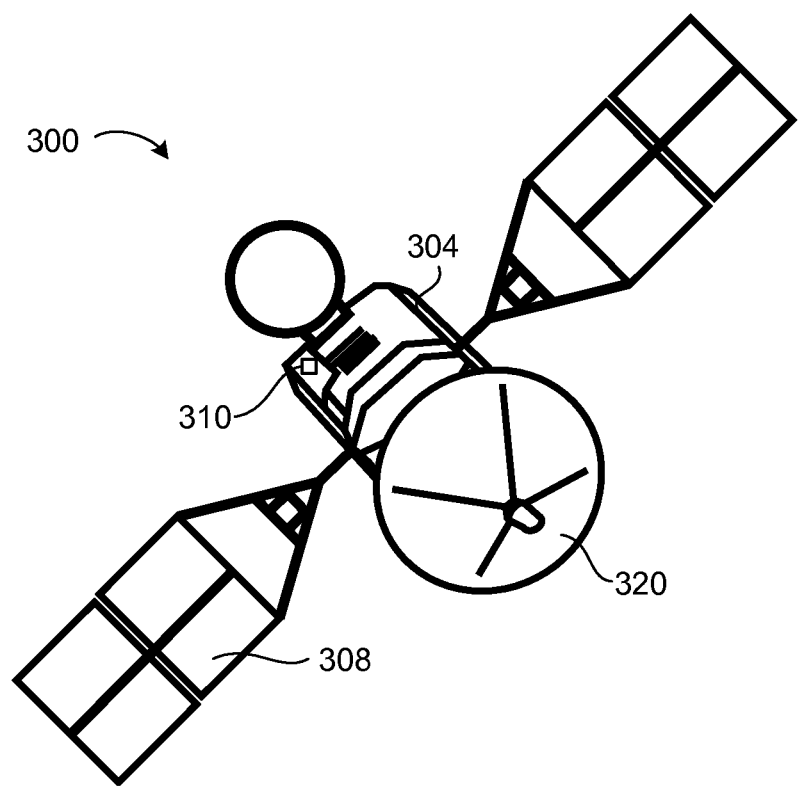
FIG. 3 is a perspective view of an example satellite.
Figure 4:
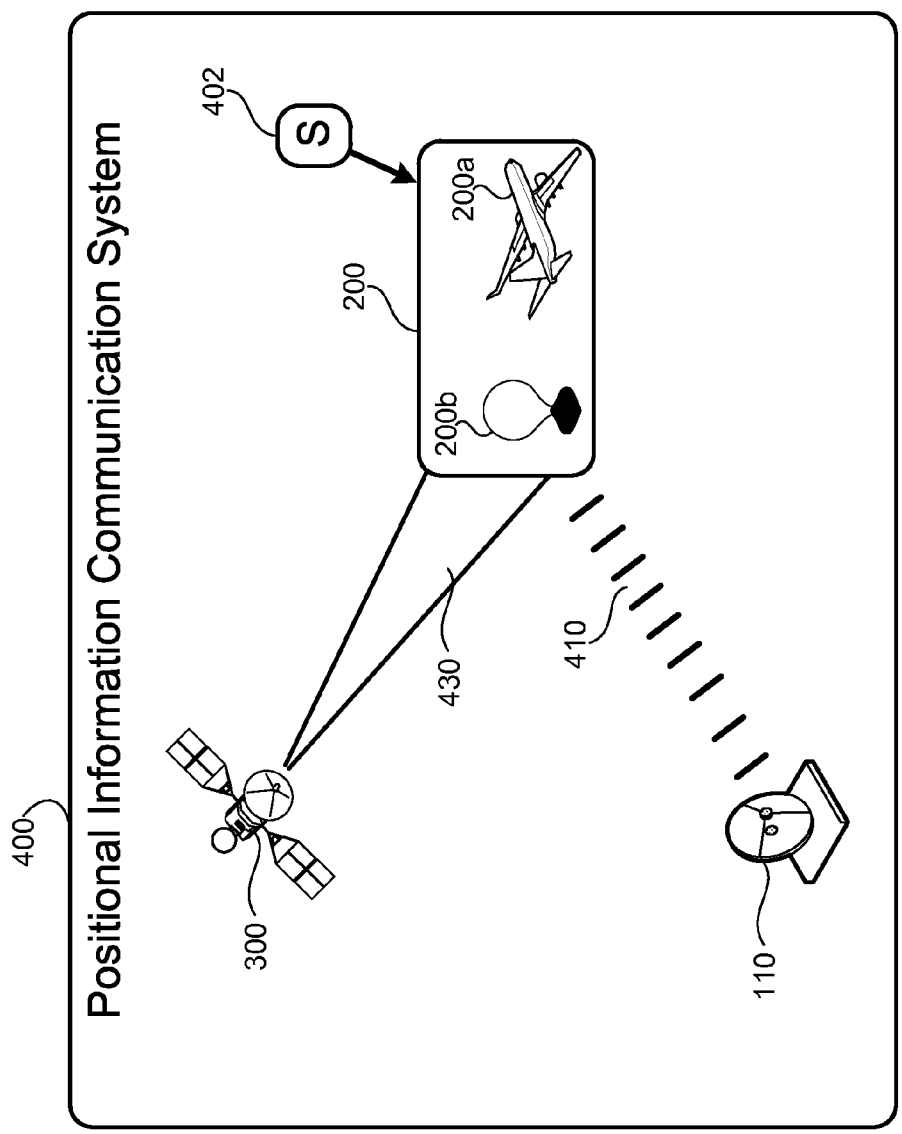
FIG. 4 is a schematic view of an exemplary path for communicating positional information to high-altitude platforms.

Referring to FIG. 3, a satellite 300 is an object placed into orbit 302 (FIG. 1B) around the earth 5 and may serve different purposes, such as military or civilian observation satellites, communication satellites, navigations satellites, weather satellites, and research satellites. The orbit 302 of the satellite 300 varies depending in part on the purpose of the particular satellite 300. Satellite orbits 302 may be classified based on their altitude from the surface of the earth 5 as Low Earth Orbit (LEO), Medium Earth Orbit (MEO), and High Earth Orbit (HEO). LEO is a geocentric orbit (i.e., orbiting around the earth 5) that ranges in altitude from 0 miles-1,240 miles. MEO is also a geocentric orbit that ranges in altitude from 1,200 miles-22,236 miles. HEO is also a geocentric orbit and has an altitude above 22,236 miles. Geosynchronous Earth Orbit (GEO) is a special case of HEO. Geostationary Earth Orbit (GSO, although sometimes also called GEO) is a special case of Geosynchronous Earth Orbit.

In some implementations, a satellite 300 includes a satellite body 304 having a data processing device 310, e.g., similar to the data processing device 220 of the HAPs 200. The data processing device 310 executes algorithms to determine where the satellite 300 is heading. The satellite 300 also includes an antenna 320 for receiving and transmitting a communication 20. The satellite 300 includes solar panels 308 mounted on the satellite body 304 for providing power to the satellite 300. In some examples, the satellite 300 includes rechargeable batteries used when sunlight is not reaching and charging the solar panels 308.

When constructing a global-scale communications system 100 using HAPs 200, it is sometimes desirable to route traffic over long distances through the system 100 by linking HAPs 200 to satellites 300 and/or one HAP 200 to another. For example, two satellites 300 may communicate via inter-device links and two HAPs 200 may communicate via inter-device links (as illustrated on FIG. 1B). Inter-device links (IDLs) eliminate or reduce the number of HAPs 200 or satellites 300 to gateway 110 hops of the communication 20, which decreases the latency and increases the overall network capabilities. Inter-device links (IDLs) allow for communication 20 traffic from one HAP 200 or satellite 300 covering a particular region to be seamlessly handed over to another HAP 200 or satellite 300 covering the same region, where a first HAP 200 or satellite 300 is leaving the region and a second HAP 200 or satellite 300 is entering the region. Such inter-device linking IDL is useful to provide communication services to areas far from source and destination ground stations 110a, 110b and may also reduce latency and enhance security (fiber optic cables may be intercepted and data going through the cable may be retrieved). This type of inter-device communication is different than the "bent-pipe" model, in which all the signal traffic goes from a source ground station 110a to a satellite 300, and then directly down to a to destination ground station 110b (e.g., user terminal) or vice versa. The "bent-pipe" model does not include any inter-device communications. Instead, the satellite 300 acts as a repeater. In some examples of "bent-pipe" models, the signal received by the satellite 300 is amplified before it is re-transmitted; however, no signal processing occurs. In other examples of the "bent-pipe" model, part or all of the signal may be processed and decoded to allow for one or more of routing to different beams, error correction, or quality-of-service control; however no inter-device communication occurs.

In some implementations, large-scale communication constellations are described in terms of a number of orbits 202, 302 and the number of HAPs 200 or satellites 300 per orbit 202, 302. HAPs 200 or satellites 300 within the same orbit 202, 302 maintain the same position relative to their intra-orbit HAP 200 or satellite 300 neighbors. However, the position of a HAP 200 or a satellite 300 relative to neighbors in an adjacent orbit 202, 302 may vary over time. For example, in a large-scale satellite constellation with near-polar orbits, satellites 300 within the same orbit 302 (which corresponds roughly to a specific latitude, at a given point in time) maintain a roughly constant position relative to their intra-orbit neighbors (i.e., a forward and a rearward satellite 300), but their position relative to neighbors in an adjacent orbits 302 varies over time. A similar concept applies to the HAPs 200; however, the HAPs 200 may move about the earth 5 along a latitudinal plane and maintain roughly a constant position to a neighboring HAP 200.

A source ground station 110a may be used as a connector between satellites 300 and the internet, or between HAPs 200 and user terminals 110b. In some examples, the system 100 utilizes the source ground station 110a as linking-gateways for relaying a communication 20 from one HAP 200 or satellite 300 to another HAP 200 or satellite 300, where each HAP 200 or satellite 300 is in a different orbit 202, 302. For example, source ground station 110a may serve as a linking-gateway by receiving a communication 20 from an orbiting satellite 300, processing the communication 20, and switching the communication 20 to another satellite 300 in a different orbit 302. Therefore, the combination of the satellites 300 and the linking-gateways 110a provide a fully-connected communication system 100.

Maintaining the positioning and orbit 202 of each HAP 200 about the earth 5 in the global-scale communication system 100 maintains reliability of the communication system 100 and control of the HAP 200. In addition to the transmission of a signal including the communication 20 as illustrated in FIGS. 1A-1C, FIG. 4 illustrates a positional information communication system 400 for transmitting positional information between the devices (i.e., ground stations 110, HAPSs 200, and satellites 300). For example, the ground stations 110 may transmit a direct HAP communication signal 410 to one or more HAPs 200. The direct HAP communication signal 410 may relay information relating to the orbit 202 and position of the HAP 200. For example, the direct HAP communication signal 410 may include flight plan or orbital information, movement commands, or positional information allowing the HAP 200 to determine its location. Additionally, each satellite 300 may concentrate a communication within one or more spot beams 430. The signal may include location and time information of a satellite-based global positioning system. The HAP 200 may utilize the positional information communicated by a spot beam 430 from a satellite 300 or the positional information communicated by multiple spot beams 430 from multiple satellites 300 (e.g., at any given time, a HAP 200 may have between two to five, or even more than five, satellites 300 within view in some networks) to track its location or to navigate according to a planned route.

Due to the importance of the location of the HAP 200 to the overall functioning of the global-scale communication system 100, a non-authorized adversary to the communication system 100 may desire to spoof the communication of the positional information. If the HAP 200 receives the spoofed signal and cannot falsify it, the adversary may either direct the HAP 200 off course or may otherwise disrupt the transmission of the communication 20 throughout the communication system 100. The data processing device 220 of the HAP 200 may perform a falsification check of the received positional information. The HAP 200 receives a seed value data packet 402 containing information to enable the data processing device 220 of the HAP 200 to perform the falsification check to verify the source of the information. The seed value data packet 402 may be supplied to the HAP 200 prior to launching the HAP 200 into the atmosphere (i.e. during manufacture of the HAP 200). In this case, the seed value data packet 402 must contain sufficient information for performing the falsification check for an operation life of the HAP 200. As an alternative, the seed value data packet 402 may be supplied to the HAP 200 through a transmission, which may be over an out-of-band channel, via satellite, or by any other communication channel. In some cases, the seed value data packet 402 is written with a digital signature. The seed value data packet 402 may contain sufficient information for performing the falsification check for the operation life of the HAP 200, or periodic seed value data packets 402 may be transmitted with each of the periodic seed value data packets 402 containing information for performing the falsification check for a finite period of time.

During each orbit, each HAP 200 may receive positional information from a set of sources (e.g., one or more spot beams 430). In order to perform a falsification check for each source of positional information, the seed value data packet 402 provides the HAP 200 with information enabling a falsification check of each source of positional information from which the HAP 200 may receive communications.

Turning to the system and method by which a HAP 200 performs the falsification check of the positional information to verify the source of the information, while the disclosed systems and methods represent systems and methods for a HAP 200 to verify the source of positional information, the disclosed systems and methods also relates to other applications as well. For example, any receiver could utilize the disclosed systems and methods to verify the source of information. Additionally, the disclosed systems and methods are not limited to instances in which the transmitter transmits only positional information. The disclosed systems and methods may be utilized to verify the source of any communication or any communication connection, with both communication and communication connection interchangeably referring to any transfer of information.

Figure 5:
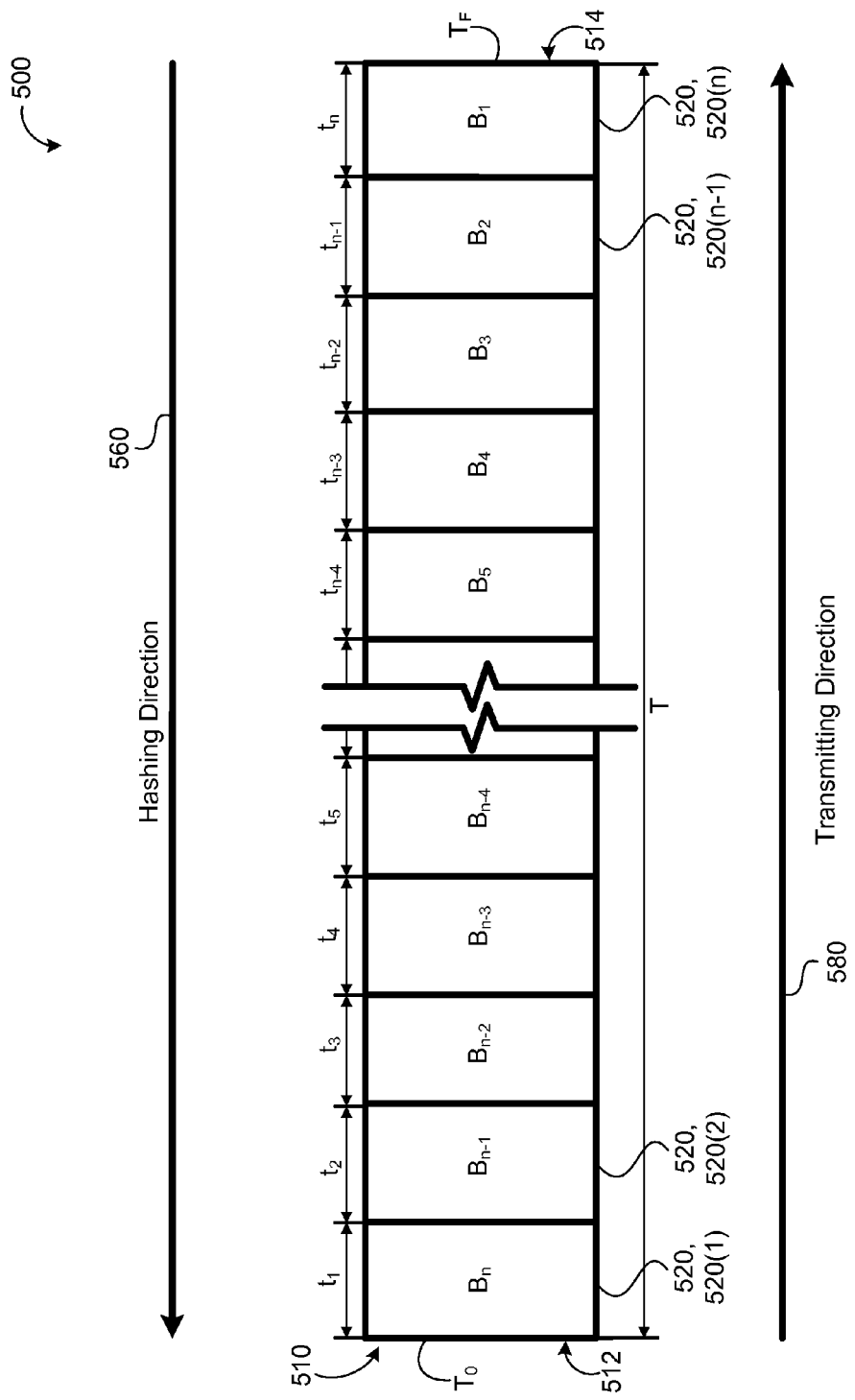
FIG. 5 is a schematic view of a system for authenticating a communication.

FIG. 5 provides a schematic view of an example system 500 for authenticating a communication. Data processing hardware, which is described further hereinafter, identifies an operation period 510 having a first end 512 and a second end 514 and spanning a time length, T. The operation period 510 begins at an initial time, $T_0$, and ends at a final time, $T_F$. The initial time, $T_0$, coincides with the first end 512 of the operation period 510, and the final time, $T_F$, coincides with the second end 514 of the operation period 510. For example, the data processing hardware could set the initial time, $T_0$, equal to 12:00:00 AM EDT 1 Jan. 2020 and could set the final time, $T_F$, equal to 12:00:00 AM EDT 1 Jan. 2040 to identify an operation period 510 having a time length, T, equal to twenty years (T=20 years). The initial time, $T_0$, and the final time, $T_F$, could be set at any value with the initial time, $T_0$, occurring before the final time, $T_F$, without deviating from the scope of this disclosure. Additionally, the operation period 510 may have a time length, T, equaling more than twenty years (T>20 years) or less than twenty years (T<20 years) without deviating from the scope of this disclosure.

The data processing hardware also divides the operation period 510 into an integer number, n, of time intervals 520 with each 520(1), 520(2), . . . , 520(n-1), 520(n) of the integer number, n, of time intervals 520 spanning for a length of time, $t_1, t_2, \ldots t_{n-1}, t_n$. A first time interval 520(1) begins at the initial time, $T_0$, and is arranged adjacent to the first end 512 of the operation period 510. A last time interval 520(n), also called the $n^{th}$ time interval, ends at the final time, $T_F$, and is arranged adjacent to the second end 514 of the operation period 510. The lengths of time, $t_1, t_2, \ldots t_{n-1}, t_n$, corresponding to the time intervals 520 may each be set equal to a preset time, t, such that $t_1=t_2= \ldots =t_{n-1}=t_n=t$. For example, when dividing the operation period 510, the data processing hardware could set the preset time, t, equal to one second. Expanding on the above example, if the preset time, t, equals one second (i.e., t=1 s), the first time interval 520(1) could begin at 12:00:00 AM EDT 1 Jan. 2020 and could end at 12:00:01 AM EDT 1 Jan. 2020, the second time interval 520(2) could begin at 12:00:01 AM EDT 1 Jan. 2020 and could end at 12:00:02 AM EDT 1 Jan. 2020, and each subsequent time interval 520 could similarly span one second until the data processing hardware sets the last time interval 520(n) as beginning at 11:59:59 AM EDT 31 Dec. 2039 and ending at 12:00:00 AM EDT 1 Jan. 2040. Notably, the preset time, t, may be set at any other time without deviating from the scope of this disclosure. For example, the preset time, t, may be set at a value greater than one second (t>1 s) or at a value less than one second (t<1 s).

Once the data processing hardware has finalized the time length, T, of the operation period 510 and the preset time, t, of the time intervals 520, then the integer number, n, of time intervals may be determined as the quotient of dividing the time length, T, by the present time, t, as illustrated in Equation 1:

$$n = T/t \quad \text{(Eq. 1)}$$

For example, expanding on the above example where the time length, T, equals twenty years (or 631,152,000 seconds) and the preset time, t, equals one second, Equation 1 demonstrates that the integer number, n, of time intervals 520 should be set as n=631,152,000. The integer number, n, of time intervals 520 can be increased (for example, by increasing the time length, T, or decreasing the preset time, t) or can be decreased (for example, by decreasing the time length, T, or increasing the preset time, t) without deviating from the scope of this disclosure.

The data processing hardware also populates each 520(1), 520(2), . . . , 520(n-1), 520(n) of the integer number, n, of time intervals 520 with an authentication value, B. To populate the time intervals 520 with an authentication value, B, the data processing hardware sequentially populates one time interval 520 after another along a hashing direction 560 from the second end 514 of the operation period 510 to the first end 512 of the operation period 510. The first of the integer number, n, of time intervals 520 that the data processing hardware populates is the $n^{th}$ time interval 520(n), which the data processing hardware populates with a first authentication value, $B_1$. Moving in the hashing direction 560, the second of the integer number, n, of time intervals 520 that the data processing hardware populates is the n-$1^{th}$ time interval 520(n-1), which the data processing hardware populates with a second authentication value, $B_2$. The data processing hardware continues to populate each of the integer number, n, of time intervals 520 along the hashing direction 560 until the data processing hardware has populated all of the time intervals 520, ending when the data processing hardware populates the first time interval 520(1) with an $n^{th}$ authentication value, $B_n$.

Figure 6:
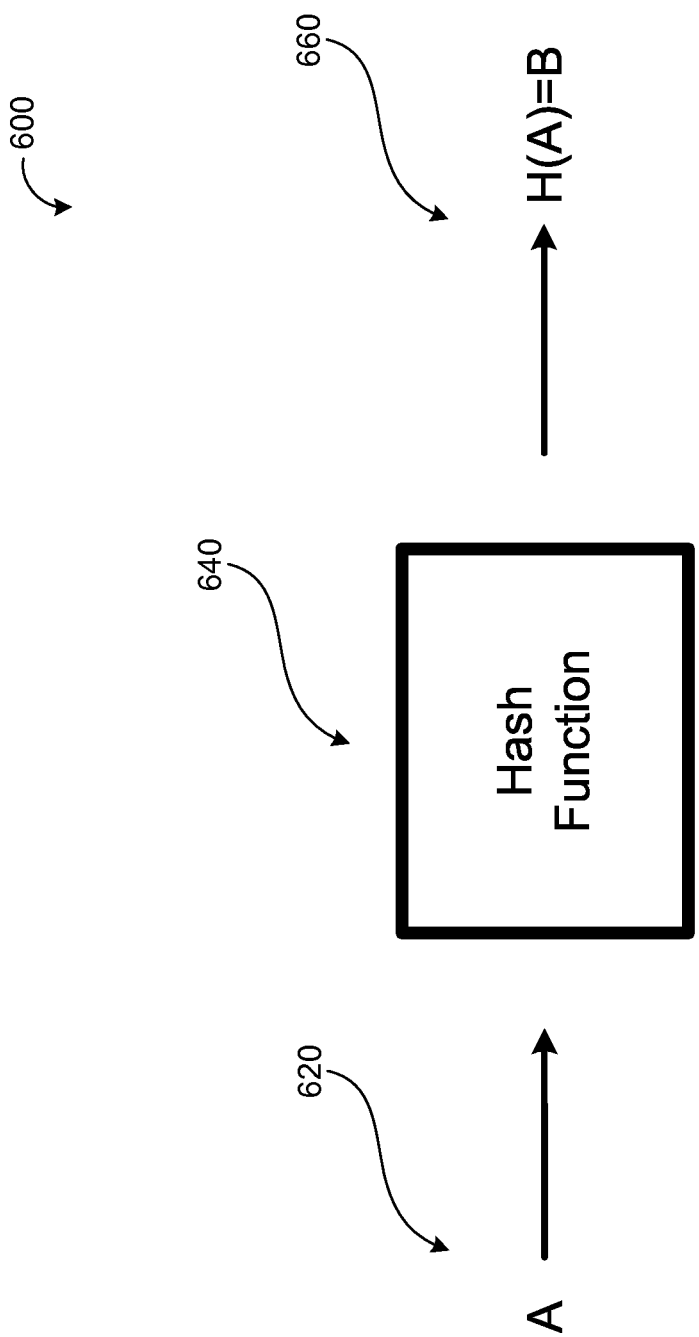
FIG. 6 is a schematic view of a secure hash function operation.

During population of the integer number, n, of time intervals 520, the data processing hardware determines authentication values, B, in a fashion creating a relationship between the authentication values, B, in adjacent time intervals 520. To create this relationship between the authentication values, B, in adjacent time intervals 520, the data processing hardware may utilize a hashing algorithm 600. Referring to FIG. 6, a hashing algorithm 600 utilizes a hash function 640 to transform a preimage 620 into a digest 660. The preimage 620, also represented by the letter 'A' in FIG. 6, represents the message data that becomes an input value into a hash function 640 for processing. The digest 660, also represented by the letter 'B' or the expression 'H(A)' in FIG. 6, represents the output resulting from the processing of the hash function 640. The digest 660 is also commonly referred to as a message digest, a hash output, or a hash value. The system 500 for authenticating a communication utilizes the digest 660 of a hash function 640 to determine the authentication values, B, populated into the integer number, n, of time intervals 520 of the operation period 510. Each authentication value, $B_1, B_2, \ldots, B_{n-1}, B_n$, represents a digest 660 corresponding to a different preimage 640 processed by the hash function 640. The processing of the hashing function 640 may also be called 'hashing.'

The hash function 640 utilized in the hashing algorithm 600 may be implemented as any function that is difficult or virtually impossible to invert. Inversion of a function occurs when the output (e.g., the digest 660 of a hash function 640) of the function determines the input (e.g., the preimage 620). If the digest 660 of a hash function 640 is known, a determination of the preimage 620 can be difficult or virtually impossible, even if the particular hash function 640 utilized to process the preimage 620 into the digest 660 is known. This property of inversion-resistance of a hash function is commonly referred to as preimage resistance. Another property of a hash function 640 that may be utilized in hashing algorithm 600 is commonly referred to as collision resistance. This collision-resistance property of a hash function 640 refers to the ability of the hash function 640 to process a unique digest 660 for each of a very large number of preimages 620 that are input into the hash function 640. In other words, collision resistance refers to the ability of a hash function 640 to output a different digest 660 for each preimage 620.

The size of a hash function 640 refers to the length in bits of the full digest 660 resulting from the processing of the hash function 640. For example, the size of a hash function 640 utilized in the hashing algorithm 600 may be 60 bits, 80 bits, 160 bits, 224 bits, 256 bits, 384 bits, or 520 bits. Additionally, the size of the hash function 640 may vary between less than 60 bits to more than 520 bits without deviating from the scope of this disclosure. Generally, the collision resistance and preimage resistance properties of the hash function 640 improve as the size of the hash function 640 increases. However, to minimize the bandwidth of the communication channel consumed by the system 500 for authenticating a communication, moderate levels of collision resistance and preimage resistance may be sufficient in order to utilize a smaller-sized hash function 640. When the data processing hardware of the system 500 for authenticating a communication divides that operation period 510 into time intervals 520 having a small preset time, t, (for example, t=1 s), the necessary preimage resistance requirements of the hash function 640 may be satisfied by utilizing a hash function 640 having a size on the smaller end of the spectrum (e.g., 60 bits or 80 bits).

One exemplary family of hash functions 640, known as SHA-2, is discussed in U.S. Pat. No. 6,829,355, which is herein incorporated by reference in its entirety. The National Institute of Standards and Technology (NIST) of the United States Department of Commerce has released publications including guidelines that: 1.) list and specify governmentally approved hash functions 640 along with associated properties, such as hash function 640 size, (NIST, FIPS Pub. 180-4: Secure Hash Standards, 2012); and 2.) provide security guidelines for supporting the requires or desired security strengths of applications employing the approved hash functions 640 (NIST Special Pub. 800-107, rev. 1: Recommendation for Applications Using Approved Hash Algorithms, 2012). These publications are also fully incorporated herein by reference. All of the governmental approved hash functions 640 of FIPS 180-4 may be implemented in the system 500 for authenticating a communication of this disclosure. However, these governmental approved hash functions are generally large in size (e.g. SHA-224 has a hash function 640 size of 224 bits). As discussed previously, the hashing algorithm 600 may utilize smaller hash functions 640 in the system 500 for authenticating a communication to minimize bandwidth consumption of the communication channel. Accordingly, the governmental approved hash functions 640 do not represent an exhaustive list of hash functions that can be utilized for the disclosed system 500.

Referring back to FIG. 5, to populate the integer number, n, of time intervals 520 with authentication values, B, the data processing hardware identifies a hash algorithm 600 utilizing a specific hash function 640 and a seed value, A. Starting at the $n^{th}$ time interval 520(n) at the second end 514 of the operation period 510, the data processing hardware associates a first authentication value, $B_1$, with the $n^{th}$ time interval 520(n). The first authentication value, $B_1$, may either be the seed value, A, identified by the data processing hardware, such that $B_1$=A, or the digest 660 resulting from hashing the seed value, A, in accordance with the hashing algorithm 600, such that $B_1$=H(A) (i.e., utilizing the seed value, A, as the preimage 620 processed by the hash function 640). Simply put, the first authentication value, $B_1$ represents either the seed value, A, or the digest 660 resulting from hashing the seed value, A. Next, the data processing hardware associates a second authentication value, $B_2$, with the next time interval 520 in the hashing direction, which is the n–$1^{th}$ time interval 520(n–1). The data processing hardware determines the second authentication value, $B_2$, associating with the n–$1^{th}$ time interval 520(n–1) by applying the hashing algorithm 600 to the first authentication value, $B_1$, such that $B_2$=H($B_1$). If the data processing hardware set $B_1$ as the seed value, then $B_2$=H($B_1$)=H(A). If the data processing hardware set $B_1$ as the digest 660 resulting from hashing the seed value, A, then $B_2$=H($B_1$)=H(H(A)). Next, the data processing hardware associates a third authentication value, $B_3$, with the next time interval 520 in the hashing direction, which is the n–$2^{th}$ time interval 520(n–2). The data processing hardware determines the third authentication value, $B_3$, associating with the n–$2^{th}$ time interval 520(n–2) by applying the hashing algorithm 600 to the second authentication value, $B_2$, such that $B_3$=H($B_2$). If the data processing hardware set $B_1$ as the seed value, then $B_3$=H($B_2$)=H(H($B_1$))=H(H(A)). If the data processing hardware set $B_1$ as the digest 660 resulting from hashing the seed value, A, then $B_3$=H($B_2$)=H(H($B_1$))=H(H(H(A))). The data processing hardware continues to move in the hashing direction 560 and to associate authentication values, B, with each time interval 520 by applying the hashing algorithm 600 to the authentication value, B, associated with the previously determined time interval 520. Eventually, the data processing hardware reaches the first time interval 520(1) at the first end 512 of the operation period 510. The data processing hardware associates an $n^{th}$ authentication value, $B_n$, with the first time interval 520(1) by applying the hashing algorithm 600 to the n–$1^{th}$ authentication value, $B_{n-1}$, associated with the second time interval 520(2), such that $B_n$=H($B_{n-1}$).

A transmitting device may send continuous or intermittent transmissions communicating data (e.g., positional information). The transmitting device may utilize a portion of the communication channel to transmit a commitment value along with the other communicated data. For example, returning to FIG. 4, the spot beam 430 transmitted by the satellite 300 and/or the direct HAP communication signal 410 transmitted by the ground station 110 may include a commitment value along with the communicated positional information of the spot beam 430 and/or the direct HAP communication signal 410. The commitment value transmitted by the transmitting device should be identical to the authentication value, B, associated with the time interval corresponding to the current time. In other words, the transmitting device should sequentially chose authentication values, B, along the transmitting direction 580 from the first end 512 of the operation period 510 to the second end 514 of the operation period 510 to serve as the commitment values transmitted along with the other communicated data.

Using the previously described example where the initial time, $T_0$, equals 12:00:00 AM EDT 1 Jan. 2020, the final time, $T_F$, equals 12:00:00 AM EDT 1 Jan. 2040, and the preset time, t, equals one second (t=1 s), the transmitting device could transmit $B_n$ as a commitment value beginning at 12:00:00 AM EDT 1 Jan. 2020 and ending at 12:00:01 AM EDT 1 Jan. 2020. Then, the transmitting device could transmit $B_{n-1}$ as a commitment value beginning at 12:00:01 AM EDT 1 Jan. 2020 and ending at 12:00:02 AM EDT 1 Jan. 2020. The transmitting device would transmit a new commitment value, which would correspond to each of the time intervals 520 along the transmitting direction 580, until it transmitted $B_1$ as a final commitment value of the operation period 510 beginning at 11:59:59 AM EDT 31 Dec. 2039 and ending at 12:00:00 AM EDT 1 Jan. 2040.

In order to transmit the commitment values in accordance with the disclosed system 500 for authenticating a communication, the data processing device controlling the communications and other functions of the transmitting device could include the data processing hardware for performing the steps to divide the operation period 510 into an integer number, n, of time intervals 520 and to associate each time interval 520 with an authentication value, B. Alternatively, the data processing hardware for performing these steps could be included elsewhere at the transmitting device, or the data processing hardware could be located remote from the transmitting device but in communication with the transmitting device. If the data processing hardware resides at the transmitting device, then it must receive a data packet providing information regarding the hashing algorithm 600 and the seed value, A, utilized to determine the authentication values, B. Among other methods, this data packet can be provided at the site of the transmitting device, can be delivered over a secure communication channel, can be delivered with a digital signature, or can be provided prior to activation of the transmitting device (e.g., during manufacture). In some implementations, the transmitting device is a satellite 300 transmitting one or more spot beams 430 with positional information, such as global positioning system data. In these implementations, the satellite 300 may also transmit a communication 20 as part of a global-scale communication system 100 or the satellite may only function as a global positioning system satellite. Also, the data processing hardware may be located within the data processing device 310 of the satellite 300. In some alternative implementations, the transmitting device is a ground station 110 transmitting a direct HAP communication signal 410.

Precise timing is important to maintain the system 500 for authenticating a communication. Accordingly, the transmitting device may include or associate with a clock 990 (shown in FIG. 9) to track the time intervals 520 with the present time. The clock 990 may be implemented atomic frequency reference, such as a micro atomic clock.

There are a number of different ways in which a receiving device may utilize the commitment values transmitted by the transmitting device to authenticate the source of the transmission in accordance with the system 500 for authenticating a communication. In some examples, when the receiving device receives a transmission having a commitment value, B, the receiving device cannot initially verify the source of the transmission. When the time interval 520 ends and a sequentially subsequent time interval 520 begins, the transmission will include a new commitment value, B. At this point, the data processing hardware of the receiving device performs a check to verify that application of the hashing algorithm 600 to the new commitment value yields the sequentially preceding commitment value of the transmission. If the data processing hardware successfully verifies, the receiving device has authenticated the source of the transmission in accordance with the system 500 for authenticating a communication. After each preset time, t, the transmitting device begins to transmit a new authentication value, B, and the data processing hardware of the receiving device re-verifies the source of the transmission. In this fashion, the receiving device can repeatedly verify that the received transmission originates from the authenticated transmitting device.

In alternate examples, the receiving device includes the necessary data processing hardware for performing the steps to divide an operation period 510 into an integer number, n, of time intervals 520 and to associate each time interval 520 with an authentication value, B. In these examples, the data processing hardware possesses the required knowledge of factors associated with the transmitting device, such as knowledge of the seed value, A, the operational period 510, and preset time, t, of the time intervals. Accordingly, upon receiving a transmission having a commitment value, the data processing hardware of the receiving device identifies the time interval 520 of the operation period 510 for the transmitting device corresponding to a current time and the authentication value, B, associated with that time interval 520. If the transmitted commitment value matches the authentication value, B, associated with the time interval 520, then the receiving device has authenticated the source of the transmission. After each preset time, t, the transmitting device begins to transmit a new authentication value, B, and the data processing hardware of the receiving device re-verifies the source of the transmission in accordance with the system 500 for authenticating a communication. In this fashion, the receiving device can repeatedly verify that the received transmission originates from the authenticated transmitting device.

Figure 7:
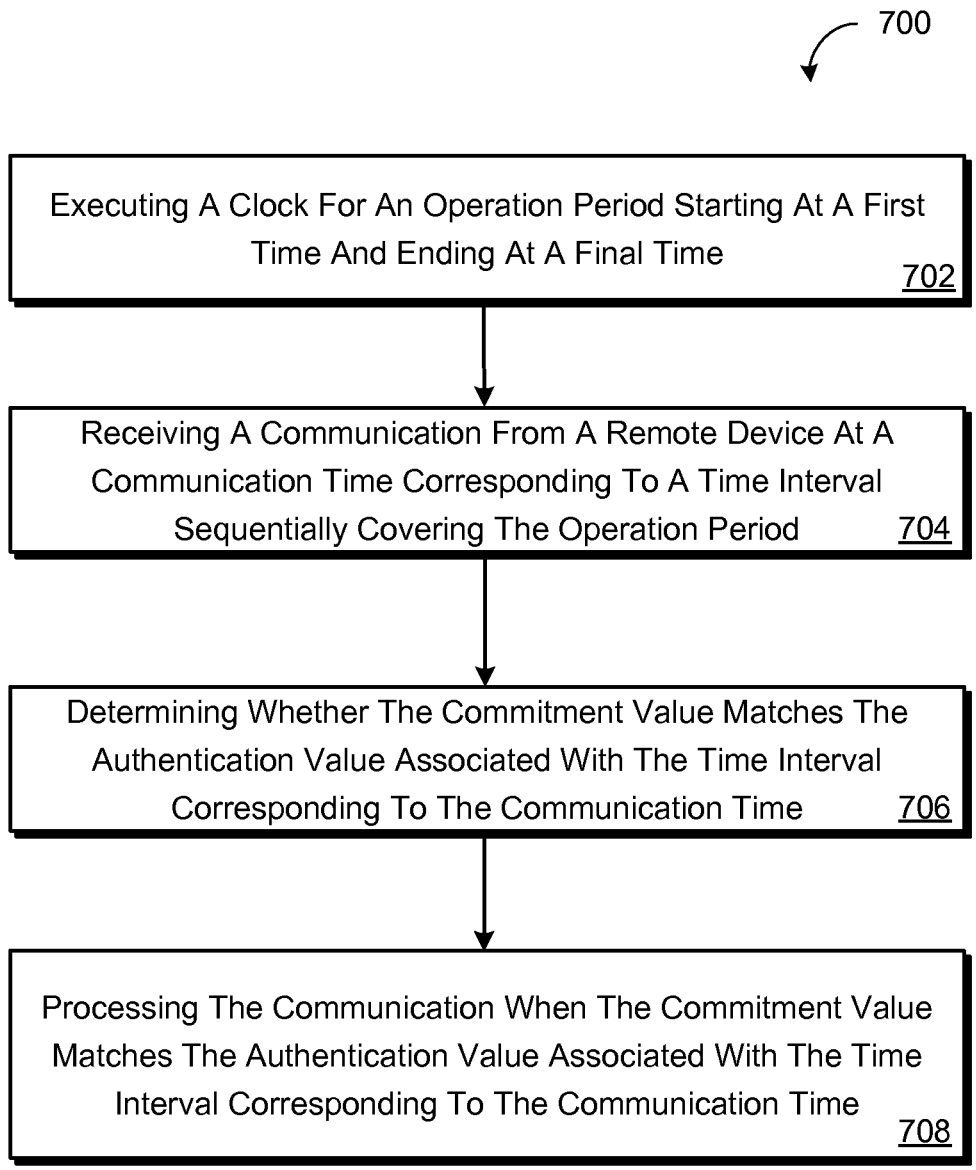
FIGS. 7 and 8 are schematic views of exemplary arrangements of operations for authenticating positional information.

FIG. 7 illustrates an exemplary arrangement of operations for a method 700 undertaken by a receiving device. At block 702, the method 700 includes executing a clock 900 for an operation period 510 starting at a first time, $T_O$, and ending at a final time, $T_F$. Data processing hardware associated with the receiving device executes the clock 990 for the operation period 510. At block 704, the method 700 includes receiving a communication from a remote device at a communication time corresponding to a time interval 520 sequentially covering the operation period 510. Each time interval 520 associates with an authentication value, B. The data processing hardware associated with the receiving device receives the communication. The communication may be a spot beam 430 from a satellite 300, a direct HAP communication signal 410 from a ground station 110, or any other communication. The communication includes a commitment value. At block 706, the method 700 includes determining whether the commitment value matches the authentication value, B, associated with the time interval 520 corresponding to the communication time. The data processing hardware associated with the receiving device determines whether the commitment value matches the authentication value, B. At block 708, the method 700 includes processing the communication at the data processing hardware when the commitment value matches the authentication value, B, associated with the time interval 520 corresponding the to the communication time. The authentication value, B, associated with the time interval 520 corresponding to the communication time is a hash digest 660 of a hash function 640 applied to the authentication value, B, associated with a sequentially subsequent time interval of the plurality of time intervals 520. In some implementations, the receiving device is a high altitude platform 200, such as an aircraft 200a (e.g., unmanned aerial vehicle or UAV) or a communication balloon 200b and the data processing hardware is either located at the data processing device 220 of the high altitude platform 200 or located remotely but in communication with the high altitude platform 200.

Prior to block 702, the method 700 may include receiving a seed value, A, and associating the authentication values, B, to the plurality of time intervals 520. The data processing hardware associated with the receiving device may receive the seed value, A, and associate the authentication values, B, to the plurality of time intervals 520. To accomplish the association of the authentication values, B, the data processing hardware may first apply the hash function 640 to the seed value, A, to determine a last authentication value, $B_1$, for the last time interval 520(n), or the data processing hardware may set the seed value, A, as the last authentication value, $B_1$, for the last time interval 520(n). Then, the data processing hardware may, for each sequentially preceding time interval 520, apply the hash function 640 to a subsequent authentication value, B, associated with a sequentially subsequent time interval 520 to determine a preceding authentication value, B, for the sequentially preceding time interval 520. The seed value, A, may be received by the data processing hardware during the manufacture of the receiving device. The seed value, A, may be transmitted to the data processing hardware from a remote location, such as a ground station 110, over a communication network while the receiving device is operational.

If the communication received from a remote device is a connection request, the method 700 may include establishing a communication connection between the data processing hardware and the remote device when the commitment value matches the authentication value, B, associated with the time interval 520 corresponding to the communication time. At block 706 of the method 700, the data processing hardware may determine whether the commitment value matches the authentication value, B, associated with the time interval 520 corresponding to the communication time by applying the hash function 640 to the commitment value and determining whether the hash digest 660 of the hash function 640 matches an earlier commitment value associated with a sequentially subsequent time interval 520.

The remote device from which the data processing hardware receives the communication at block 704 of the method 700 may be a satellite 300. The communication may include global positioning system data, such as position and time information. The remote device from which the receiving device receives the communication at block 704 of the method 700 may be a communication station 110. The communication may comprise a direct HAP communication signal 410.

Figure 8:
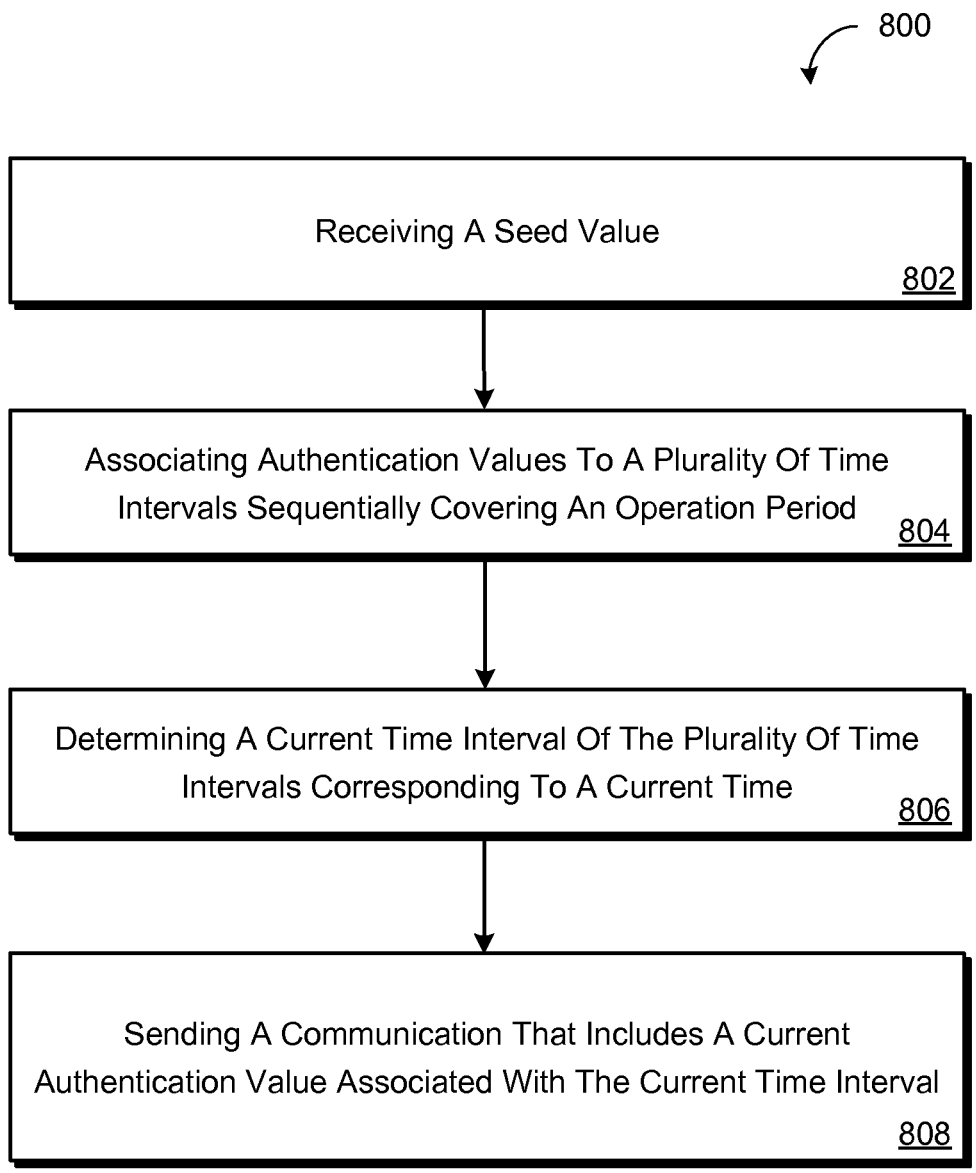

FIG. 8 illustrates an exemplary arrangement of operations for a method 800 undertaken by a transmitting device. At block 802, the method 800 includes receiving a seed value, A, at data processing hardware associated with the transmitting device. At block 804, the method 800 includes associating authentication values, B, to a plurality of time intervals 520 sequentially covering an operation period 510. At block 804, the data processing hardware associated with the transmitting device first sets a last authentication value, $B_1$, to associate with a last time interval 520(n) of the plurality of time intervals 520, and then, for each sequentially preceding time interval 520, the data processing hardware applies a hash function 640 to a subsequent authentication value, B, associated with a sequentially subsequent time interval 520 to determine a preceding authentication value, B, for the sequentially preceding time interval 520. At block 806, the method 800 includes determining a current time interval of the plurality of time intervals 520 corresponding to a current time. The data processing hardware associated with the transmitting device determines the current time interval 520. At block 808, the method 800 includes sending a transmission that includes a current authentication value, B, associated with the current time interval 520. In some implementations, the transmitting device is a satellite 300 and the data processing hardware is either located at the data processing device 310 of the satellite 300 or located remotely but in communication with the satellite 300. In alternate implementations, the transmitting device is a ground station 110 and the data processing hardware is either located at the ground station 110 or located remotely but in communication with the ground station 110.

At block 802 of the method 800, the data processing hardware may receive the seed value, A, during manufacturing of the transmitting device. Alternatively, at block 802 of the method 800, the data processing hardware may receive the seed value, A, from a transmission from a remote location over a communication network. At block 804 of the method 800, the data processing hardware may set the last authentication value, $B_1$, by first applying the hashing algorithm 600 to the seed value, A, and setting the resulting digest 660 as the last authentication value, $B_1$. Alternatively, at block 804 of the method 800, the data processing hardware may set the seed value, A, as the last authentication value, $B_1$. At block 808 of the method 800, the data processing hardware may send a communication that includes a connection request directed at the remote device in addition to the commitment value and any other communicated information. The method 800 may further include establishing a communication connection between the data processing hardware and the remote device when the commitment value matches the authentication value, B, associated with the time interval 520 corresponding to the communication time.

The remote device to which the data processing hardware associated with the transmitting device sends the communication at block 808 of the method 800 may be a high altitude platform 200, such as an aircraft 200a (e.g., an unmanned aerial vehicle or UAV) or a communication balloon 200b. The communication to the remote device at block 808 of the method 800 may additionally include global positioning system data (i.e., position and time information). The method 800 may also include executing a clock 990 and determining the current time. The data processing hardware associated with the transmitting device executes the clock 990, and the clock 990 determines the current time.

Figure 9:
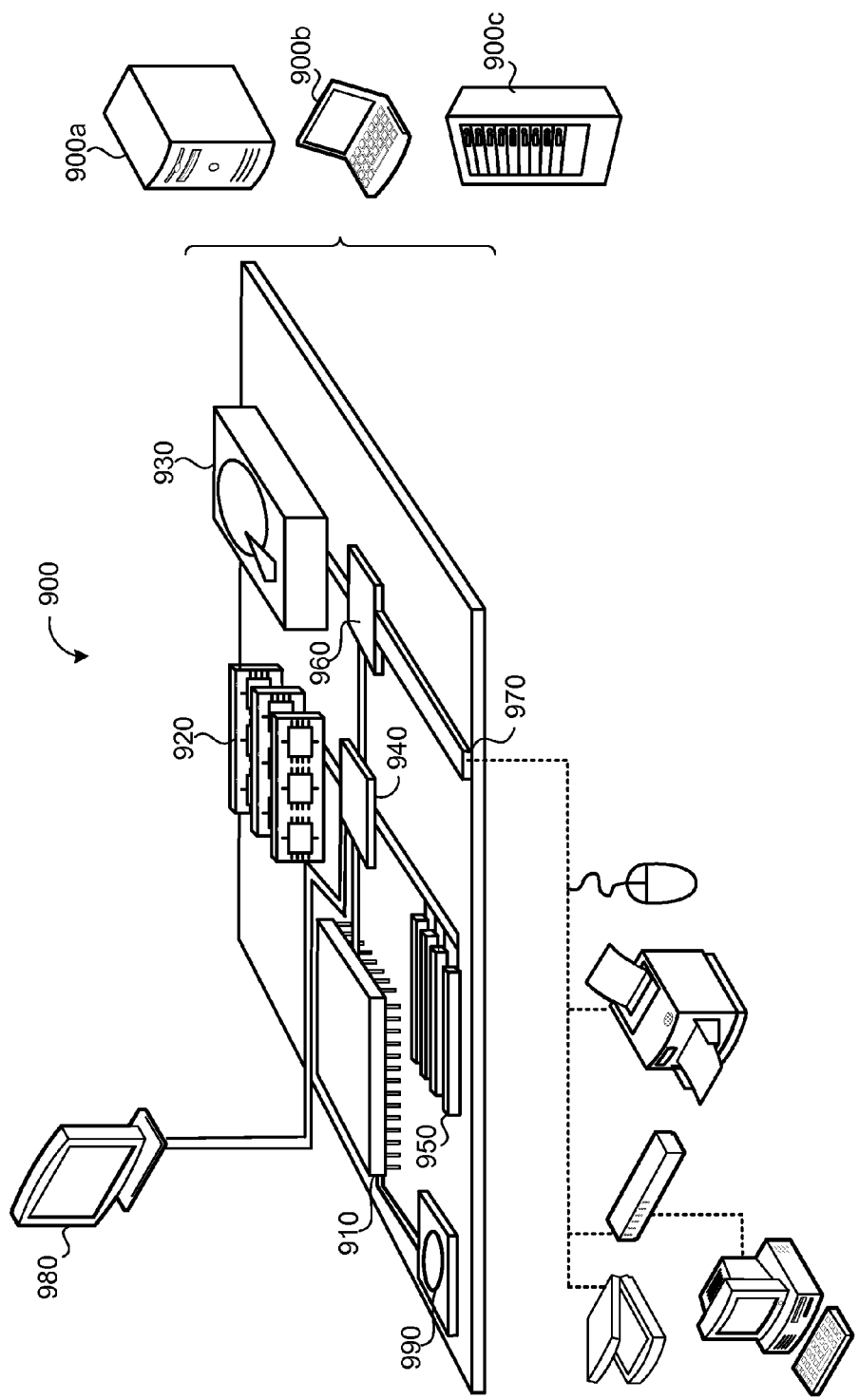
FIG. 9 is a schematic view of an example computing device.

Referring the FIG. 9, a schematic view of an example computing device 900 that may be used to implement the systems and methods described in this document. The computing device 900 is intended to represent various forms of digital computers, such as laptops, desktops, workstations, personal digital assistants, servers, blade servers, mainframes, and other appropriate computers, such as computing devices incorporating the data processors of the various devices described in this disclosure. The components shown here, their connections and relationships, and their functions, are meant to be exemplary only, and are not meant to limit implementations of the inventions described and/or claimed in this document.

The computing device 900 includes a data processor 910, memory 920, a storage device 930, a high-speed interface/controller 940 connecting to the memory 920 and high-speed expansion ports 950, a low speed interface/controller 960 connecting to low speed bus 970 and storage device 930, and a clock 990. Each of the components 910, 920, 930, 940, 950, 960, and 990, are interconnected using various busses, and may be mounted on a common motherboard or in other manners as appropriate. The processor 910 can process instructions for execution within the computing device 900, including instructions stored in the memory 920 or on the storage device 930 to display graphical information for a graphical user interface (GUI) on an external input/output device, such as display 980 coupled to high speed interface 940. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 920 stores information non-transitorily within the computing device 900. The memory 920 may be a computer-readable medium, a volatile memory unit(s), or non-volatile memory unit(s). The non-transitory memory 920 may be physical devices used to store programs (e.g., sequences of instructions) or data (e.g., program state information) on a temporary or permanent basis for use by the computing device 900. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 930 is capable of providing mass storage for the computing device 900. In some implementations, the storage device 930 is a computer-readable medium. In various different implementations, the storage device 930 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 920, the storage device 930, or memory on processor 910.

The high speed controller 940 manages bandwidth-intensive operations for the computing device 900, while the low speed controller 960 manages lower bandwidth-intensive operations. Such allocation of duties is exemplary only. In some implementations, the high-speed controller 940 is coupled to the memory 920, the display 980 (e.g., through a graphics processor or accelerator), and to the high-speed expansion ports 950, which may accept various expansion cards (not shown). In some implementations, the low-speed controller 960 is coupled to the storage device 930 and low-speed expansion port 970. The low-speed expansion port 970, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 900a or multiple times in a group of such servers 900a, as a laptop computer 900b, or as part of a rack server system 900c. The computing device 900 may reside at or within any of the communication devices (e.g., ground stations 110, HAPs 200, or satellites 300) or may reside at a remote location in communication with the communication devices.

Turning to communication protocols that can be utilized by the computing device 900, the data processors, and other aspects of the system 500 of this disclosure, the border gateway protocol (BGP) is an exterior gateway protocol used to exchange routing and reachability information between autonomous systems on the internet. The protocol is classified as either a path vector protocol or a distance vector routing protocol. The path routing protocol is a computer routing protocol for maintaining the path information (of a communication 20) that gets updated dynamically. The path routing protocol is different from the distance vector routing protocol in that each entry in its routing table includes a destination network (e.g., destination ground station 110b or end user), the next router (e.g., the next linking-gateway 110a, HAP 200, or satellite 300), and the path to reach the destination ground station 110b. The distance vector routing protocol requires that a router (e.g., linking-gateway 110a, HAP 200, or satellite 300) informs its neighbors (e.g., linking-gateway 110a, HAP 200, or satellite 300) of topology changes periodically. When the system 100 uses the distance vector routing protocol, the system 100 considers the direction in which each communication 20 should be forwarded, and the distance from its destination (current position). The system 100 calculates the direction and the distance to any other HAP 200 or satellite 300 in the system 100. Direction is the measure of the cost to reach the next destination; therefore, the shortest distance between two nodes (e.g., linking-gateway 110a, HAP 200, or satellite 300) is the minimum distance. The routing table of the distance vector protocol of a current device (e.g., linking-gateway 110a, HAP 200, or satellite 300) is periodically updated and may be sent to neighboring devices. BGP does not utilize Interior Gateway Protocol (IGP).

Interior gateway protocol (IGP) may be used for exchanging routing information between devices (e.g., linking-gateway 110a, HAP 200, or satellite 300) within the system 100. This routing information can then be used to route network-level protocols like Internet Protocol (IP). By contrast, exterior gateway protocols are used to exchange routing information between autonomous systems and rely on IGPs to resolve routes within an autonomous system. IGP can be divided into two categories: distance-vector routing protocols and link-state routing protocols. Specific examples of IGP protocols include Open Shortest Path First (OSPF), Routing Information Protocol (RIP) and Intermediate System to Intermediate System (IS-IS).

The maximum flow problem and associated algorithm includes finding a feasible flow from a single source to a single destination through a network that is maximal, where the source and the destination are separated by other devices (e.g. linking-gateway 110a, HAP 200, or satellite 300). The maximum flow problem considers the upper bound capacity between the linking-gateways 110a, the HAPs 200, or the satellites 300 to determine the maximum flow. The shortest path problem includes finding a shortest path between the linking-gateways 110a, the HAPs 200, or the satellites 300300, where the shortest path includes the smallest cost. Shortest path may be defined in terms of physical distance, or in terms of some other quantity or composite score or weight, which is desirable to minimize. Other algorithms may also be used to determine the path of a communication 20.

The algorithms used to determine the path of a communication 20 may include a scoring function for assigning a score or weight value to each link (communication between the linking-gateways 110a, the HAPs 200, and/or the satellites 300). These scores are considered in the algorithms used. For example, the algorithm may try to minimize the cumulative weight of the path (i.e., sum of the weights of all the links that make up the path). In some implementations, a system data processor considers the physical distance (and, closely related, latency) between the linking-gateways 110a, the HAPs 200, and/or the satellites 300, the current link load compared to the capacity of the link between the linking-gateways 110a, the HAPs 200, and/or the satellites 300, the health of the linking-gateways 110a, the HAPs 200, and/or the satellites 300, or its operational status (active or inactive, where active indicates that the device is operational and healthy and inactive where the device is not operational); the battery of the linking-gateways 110a, the HAPs 200, and/or the satellites 300 (e.g., how long will the device have power); and the signal strength at the user terminal (for user terminal-to-satellite link).

Returning to the hardware of the system 500, various implementations of the systems and techniques described here can be realized in digital electronic circuitry, integrated circuitry, specially designed ASICs (application specific integrated circuits), FPGAs (field-programmable gate arrays), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, or code) include machine instructions for a programmable processor and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit), or an ASIC specially designed to withstand the high radiation environment of space (known as "radiation hardened", or "rad-hard").

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry. The data processing hardware of this disclosure performs the hashing algorithm 600. Additional detail on such hardware is provided in, for example, U.S. Pat. No. 5,606,616 and U.S. Pat. No. 6,021,201, both of which are fully incorporated herein by reference.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method comprising:
    dividing, by data processing hardware, an operation period into a plurality of time intervals each spanning an equal length of time, the operation period starting at an initial time and ending at a final time, and the plurality of time intervals including a first time interval beginning at the initial time and a last time interval ending at the final time;
    populating, by the data processing hardware, each of the plurality of time intervals sequentially from the last time interval to the first time interval with an associated authentication value, each authentication value based on a hash function applied to the authentication value associated with a sequentially subsequent time interval of the plurality of time intervals;
    executing, by the data processing hardware, a clock for the operation period;
    receiving, at the data processing hardware, a communication from a remote device at a communication time corresponding to a time interval of the plurality of time intervals, the communication comprising a commitment value;
    determining, by the data processing hardware, whether the commitment value matches the authentication value associated with the time interval corresponding to the communication time; and
    processing the communication at the data processing hardware when the commitment value matches the authentication value associated with the time interval corresponding to the communication time,
    wherein the authentication value associated with the time interval corresponding to the communication time comprises a hash digest of the hash function applied to the authentication value associated with the sequentially subsequent time interval of the plurality of time intervals.

2. The method of claim 1, wherein populating each of the plurality of time intervals sequentially from the last time interval to the first time interval with the associated authentication value comprises:
    receiving a seed value; and
    associating the authentication values to the plurality of time intervals by:
        applying the hash function to the seed value to determine a last authentication value for the last time interval; and
        for each sequentially preceding time interval, applying the hash function to a subsequent authentication value associated with the sequentially subsequent time interval to determine a preceding authentication value for the sequentially preceding time interval.

3. The method of claim 1, further comprising, when the communication comprises a connection request, establishing a communication connection between the data processing hardware and the remote device when the commitment value matches the authentication value associated with the time interval corresponding to the communication time.

4. The method of claim 3, further comprising, after establishing the communication connection, receiving at least one data packet comprising data from the remote device.

5. The method of claim 1, wherein the remote device comprises a satellite, and the communication further comprises global positioning system data including position and time information.

6. The method of claim 1, wherein the remote device comprises a communication station, and the communication further comprises a direct high altitude platform communication signal.

7. The method of claim 1, wherein determining whether the commitment value matches the authentication value associated with the time interval corresponding to the communication time comprises:
- applying the hash function to the commitment value; and
- determining whether the hash digest of the hash function matches a subsequent authentication value associated with a sequentially subsequent time interval.

8. A system comprising:
- data processing hardware; and
- memory hardware in communication with the data processing hardware, the memory hardware storing instructions that when executed on the data processing hardware cause the data processing hardware to perform operations comprising:
  - dividing an operation period into a plurality of time intervals each spanning an equal length of time, the operation period starting at an initial time and ending at a final time, and the plurality of time intervals including a first time interval beginning at the initial time and a last time interval ending at the final time;
  - populating each of the plurality of time intervals sequentially from the last time interval to the first time interval with an associated authentication value, each authentication value based on a hash function applied to the authentication value associated with a sequentially subsequent time interval of the plurality of time intervals;
  - executing a clock for the operation period;
  - receiving a communication from a remote device at a communication time corresponding to a time interval of the plurality of time intervals, the communication comprising a commitment value;
  - determining whether the commitment value matches the authentication value associated with the time interval corresponding to the communication time; and
  - processing the communication when the commitment value matches the authentication value associated with the time interval corresponding to the communication time,
  - wherein the authentication value associated with the time interval corresponding to the communication time comprises hash digest of the hash function applied to the authentication value associated with the sequentially subsequent time interval of the plurality of time intervals.

9. The system of claim 8, wherein populating each of the plurality of time intervals sequentially from the last time interval to the first time interval with the associated authentication value comprises:
- receiving a seed value; and
- associating the authentication values to the plurality of time intervals by:
  - applying the hash function to the seed value to determine a last authentication value for the last time interval; and
  - for each sequentially preceding time interval, applying the hash function to a subsequent authentication value associated with the sequentially subsequent time interval to determine a preceding authentication value for the sequentially preceding time interval.

10. The system of claim 8, wherein the operations further comprise, when the communication comprises a connection request, establishing a communication connection between the data processing hardware and the remote device when the commitment value matches the authentication value associated with the time interval corresponding to the communication time.

11. The system of claim 10, wherein the operations further comprise, after establishing the communication connection, receiving at least one data packet comprising data from the remote device.

12. The system of claim 8, wherein the remote device comprises a satellite, and the communication further comprises global positioning system data including position and time information.

13. The system of claim 8, wherein the remote device comprises a communication station, and the communication further comprises a direct high altitude platform communication signal.

14. The system of claim 8, wherein determining whether the commitment value matches the authentication value associated with the time interval corresponding to the communication time comprises:
- applying the hash function to the commitment value; and
- determining whether the hash digest of the hash function matches a subsequent authentication value associated with a sequentially subsequent time interval.

15. A method comprising:
- dividing, by data processing hardware, an operation period into a plurality of time intervals each spanning an equal length of time, the operation period starting at an initial time and ending at a final time, and the plurality of time intervals including a first time interval beginning at the initial time and a last time interval ending at the final time;
- receiving, at the data processing hardware, a seed value;
- populating, by the data processing hardware, each of the plurality of time intervals sequentially from the last time interval to the first time interval with an associated authentication value by:
  - applying a hash function to the seed value to determine a last authentication value for the last time interval of the plurality of time intervals; and
  - for each sequentially preceding time interval, applying the hash function to a subsequent authentication value associated with a sequentially subsequent time interval to determine a preceding authentication value for the sequentially preceding time interval;
- determining, by the data processing hardware, a current time interval of the plurality of time intervals corresponding to a current time; and
- sending, from the data processing hardware to a remote device, a communication comprising a current authentication value associated with the current time interval.

16. The method of claim 15, further comprising, when the communication comprises a connection request for the remote device, establishing a communication connection between the data processing hardware and the remote device when the current authentication value associated with the current time interval matches a commitment value of the remote device associated with a communication time of the communication.

17. The method of claim 15, wherein the remote device comprises a high altitude platform, and the communication further comprises global positioning system data including position and time information.

18. The method of claim 15, further comprising:
- executing, by the data processing hardware, a clock; and
- determining the current time using the clock.

19. A system comprising:
- data processing hardware; and memory hardware in communication with the data processing hardware, the memory hardware storing instructions that when executed on the data processing hardware cause the data processing hardware to perform operations comprising:
  dividing an operation period into a plurality of time intervals each spanning an equal length of time, the operation period starting at an initial time and ending at a final time, and the plurality of time intervals including a first time interval beginning at the initial time and a last time interval ending at the final time;
  receiving a seed value;
  populating each of the plurality of time intervals sequentially from the last time interval to the first time interval with an associated authentication value by:
    applying a hash function to the seed value to determine a last authentication value for the last time interval of the plurality of time intervals; and
    for each sequentially preceding time interval, applying the hash function to a subsequent authentication value associated with a sequentially subsequent time interval to determine a preceding authentication value for the sequentially preceding time interval;
  determining a current time interval of the plurality of time intervals corresponding to a current time; and
  sending, to a remote device, a communication comprising a current authentication value associated with the current time interval.

20. The system of claim 19, wherein the operations further comprise, when the communication comprises a connection request for the remote device, establishing a communication connection between the data processing hardware and the remote device when the current authentication value associated with the current time interval matches a commitment value of the remote device associated with a communication time of the communication.

21. The system of claim 19, wherein the remote device comprises a high altitude platform, and the communication further comprises global positioning system data including position and time information.

22. The system of claim 19, wherein the operations further comprise:
  executing a clock; and
  determining the current time using the clock.

* * * * *